United States Patent
Brunn et al.

(10) Patent No.: US 10,116,606 B2
(45) Date of Patent: *Oct. 30, 2018

(54) DETERMINING A NUMBER OF USERS ALLOWED TO ACCESS MESSAGE BASED ON MESSAGE OBJECTIVE

(71) Applicant: International Business Machines Corporation, Armonk, NY (US)

(72) Inventors: Jonathan F. Brunn, Logan, UT (US); Jennifer E. Heins, Raleigh, NC (US); Marc D. Labrecque, Chapel Hill, NC (US); Amy Widmer, Amsterdam (NL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/434,883

(22) Filed: Feb. 16, 2017

(65) Prior Publication Data

US 2017/0163581 A1 Jun. 8, 2017

Related U.S. Application Data

(63) Continuation of application No. 14/749,271, filed on Jun. 24, 2015, now Pat. No. 9,705,924.

(51) Int. Cl.
*H04L 9/00* (2006.01)
*H04L 12/58* (2006.01)
*H04L 29/06* (2006.01)

(52) U.S. Cl.
CPC ............. *H04L 51/14* (2013.01); *H04L 51/04* (2013.01); *H04L 51/18* (2013.01); *H04L 63/10* (2013.01)

(58) Field of Classification Search
CPC .......... H04L 63/10; H04L 51/18; H04L 51/04
USPC .................................................. 726/1, 4, 28
See application file for complete search history.

(56) References Cited

U.S. PATENT DOCUMENTS

| 7,237,009 | B1* | 6/2007 | Fung ..................... G06Q 10/00 709/206 |
| 8,549,171 | B2 | 10/2013 | Ramarao et al. |
| 2004/0025052 | A1* | 2/2004 | Dickenson .............. G06F 21/78 726/4 |
| 2006/0168013 | A1* | 7/2006 | Wilson ............... G05B 19/4184 709/206 |

(Continued)

FOREIGN PATENT DOCUMENTS

GB 2488976 A 9/2012

OTHER PUBLICATIONS

List of IBM Patents or Patent Applications Treated as Related; Feb. 16, 2017; pp. 1-2.

*Primary Examiner* — Haresh N Patel
(74) *Attorney, Agent, or Firm* — Fabian VanCott; Steven L. Nichols

(57) ABSTRACT

Controlling access to categorized messages includes categorizing a message into a number of categories according to a message objective. The message objective informing user association, message association, and message access rules for each of the number of categories. Controlling access to categorized messages includes determining, based on the message objective, a number of users allowed access to the message. Controlling access to categorized messages includes allowing the number of users to access the message according to the message objective.

15 Claims, 5 Drawing Sheets

(56) References Cited

U.S. PATENT DOCUMENTS

| | | | |
|---|---|---|---|
| 2007/0266095 A1* | 11/2007 | Billsus | G06Q 10/10 709/204 |
| 2009/0061825 A1* | 3/2009 | Neelakantan | H04L 29/12292 455/412.1 |
| 2010/0121954 A1* | 5/2010 | Yang | H04L 63/101 709/225 |
| 2011/0113108 A1* | 5/2011 | Nishikubo | G06Q 10/107 709/206 |
| 2011/0173557 A1* | 7/2011 | Imai | G06Q 10/10 715/772 |
| 2011/0185437 A1* | 7/2011 | Tran | H04L 63/104 726/28 |
| 2011/0307695 A1* | 12/2011 | Slater | G06F 17/30528 713/163 |
| 2012/0198084 A1* | 8/2012 | Keskitalo | H04L 67/02 709/228 |
| 2012/0306993 A1* | 12/2012 | Sellers-Blais | H04L 65/1009 348/14.08 |
| 2013/0007377 A1* | 1/2013 | Winn | G06F 9/544 711/147 |
| 2013/0024524 A1* | 1/2013 | Graff | G06Q 10/107 709/206 |
| 2013/0086180 A1 | 4/2013 | Midgen et al. | |
| 2014/0059141 A1 | 2/2014 | Belkin et al. | |
| 2014/0067702 A1* | 3/2014 | Rathod | G06Q 10/10 705/319 |
| 2014/0143202 A1* | 5/2014 | Rekula, Sr. | G06F 17/30 707/610 |
| 2016/0034562 A1* | 2/2016 | Malcolm-Dacosta | H04L 51/32 707/740 |
| 2016/0173433 A1* | 6/2016 | Bastide | G06F 17/30082 709/206 |

\* cited by examiner

DETERMINING A NUMBER OF USERS ALLOWED TO ACCESS MESSAGE BASED ON MESSAGE OBJECTIVE

BACKGROUND

A messaging system, such as an electronic mail client, allows a number of users to communicate with each other via messages. The messages may include electronic mail (email), instant messages (IM), and text messages. To allow the number of users to communicate with each other, a user such as a message originator creates and sends a message, via the message system, to other users such as message recipients. Once the message is sent to the message recipients, the message recipients can view the message via a display of a user device.

BRIEF SUMMARY

According to one aspect of the present disclosure, a method is implemented by a computer for controlling access to categorized messages. The method includes categorizing a message into a number of categories according to a message objective. The message objective informs user association, message association, and message access rules for each of the number of categories. The method includes determining, based on the message objective, a number of users allowed access to the message. The method includes allowing the number of users to access the message according to the message objective.

According to one aspect of the present disclosure, a system for controlling access to categorized messages is described. The system includes a processor, memory, communicatively connected to the processor, and an access controller. The access controller includes an establishing engine to establish, based on a number of messages associated with one of the categories, a message objective. The access controller includes a receiving engine to receive a change to the message objective. The access controller includes a categorizing engine to categorize a message into the number of categories according to the message objective. The message objective informs user association, message association, and message access rules for each of a number of categories. The access controller includes a determining engine to determine, based on the message objective, a number of users allowed access to the message. The access controller includes an allowing engine to allow the number of users to access the message according to the message objective. The access controller includes a displaying engine to display the message to the number of users allowed access to the message.

According to one aspect of the present disclosure, a computer program product to control access to categorized messages is described. The computer program product includes a non-transitory machine readable storage medium having computer program code embodied therewith. The computer program code, when executed by a processor, causes the processor to establish, based on a number of messages associated with one of the categories, a message objective. The computer program code, when executed by a processor, causes the processor to receive a change to the message objective. The computer program code, when executed by a processor, causes the processor to categorize the message into a number of categories according to the message objective. The message objective informs user association, message association, and message access rules for each of the number of categories. The computer program code, when executed by a processor, causes the processor to determine, based on the message objective, a number of users allowed access to the message. The computer program code, when executed by a processor, causes the processor to allow the number of users to access the message according to the message objective.

BRIEF DESCRIPTION OF THE SEVERAL VIEWS OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

Figure 1:
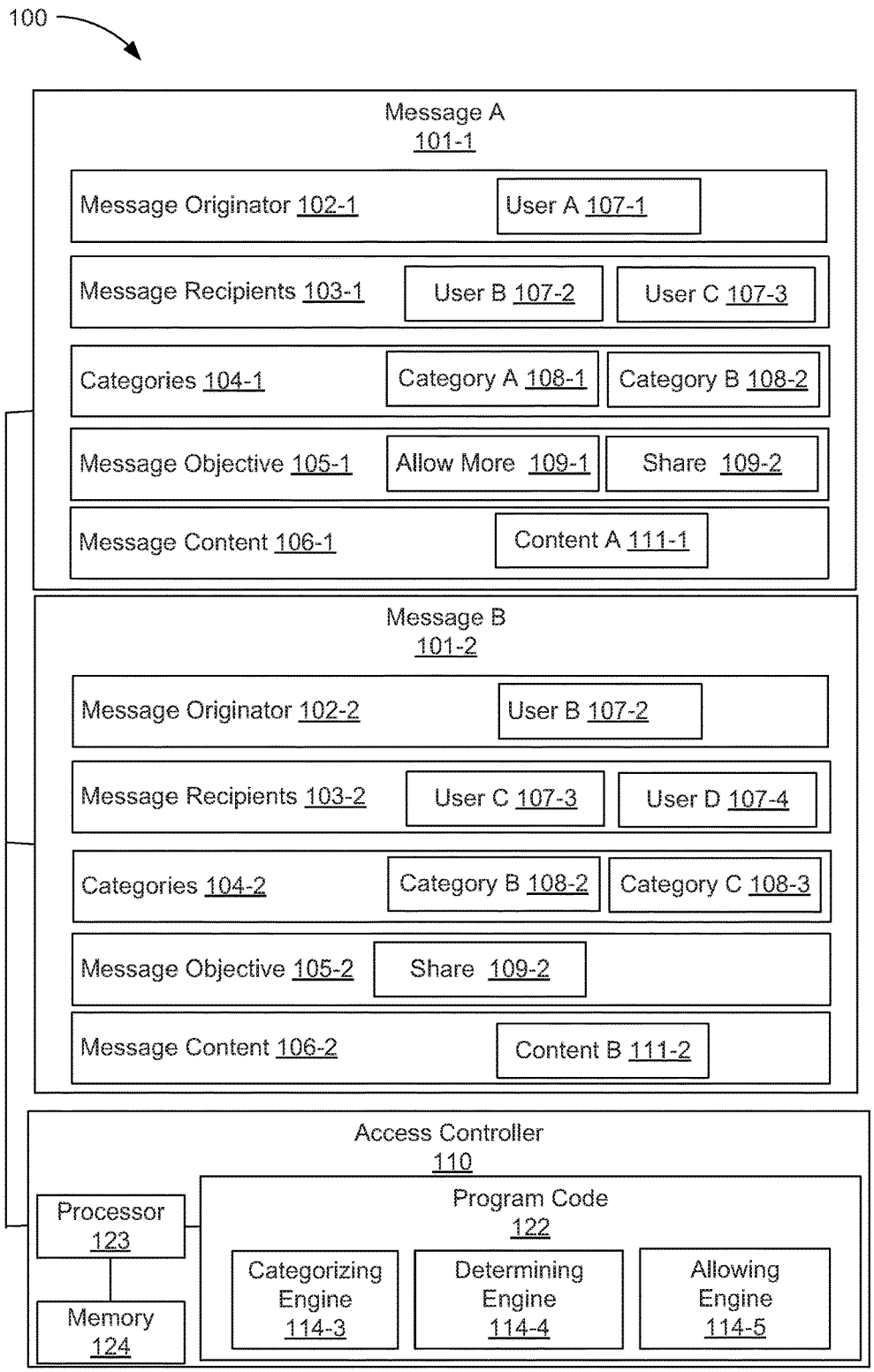
FIG. 1 is a diagram of a system for controlling access to categorized messages, according to one example of the principles described herein.

The present specification describes a method and system for providing access to categorized messages, such that the method or system provides access to a message for a number of users that are associated with the message.

The present invention may be a system, a method, and/or a computer program product. The computer program product may include a computer readable storage medium (or media), having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, JavaScript, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatuses (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus, to produce a machine such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or blocks or block diagram.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, a number of users may communicate with each other via messages. For example, a number of users, such as message recipients, may receive a first message from another user, such as a message originator. One of the message recipients may respond to the first message by creating and sending a second message. The user who creates and sends the second message may designate the same message recipients and/or the message originator to send the second message to. Further, the user who creates and sends the second message may designate new message recipients. As a result, the user who sends the second message may add new message recipients or remove past message recipients.

Although the user, such as a message originator, may remove a past message recipient out of an explicit desire to prevent sharing information, often the user removes a message recipient to focus their attention and to prevent delivering a message to an uninterested party. The message originator may not intend to prevent the past message recipient from receiving additional information. Further, message recipients may further be removed from subsequent messages as the subsequent messages diverge from an original topic. The omission of past message recipients may not be an intentional act to preserve security. The omission of past message recipients is often an effort to prevent delivering the message to uninterested parties.

Further, when the user who creates and sends the second message to the new message recipients, the new message recipients receive the second message. However, the new message recipients may not be able to access the first message. Further, the message recipients that received the first message may not receive the second message. As a result, these message recipients cannot access the second message. This may be problematic for these message recipients if the second message includes important information relating to these message recipients. Further, as new message recipients are added to new messages that are created and are related to prior messages, the new message recipients lack sufficient awareness and understanding of the prior messages. The new messages may repeat discussions that have already occurred. The new messages may include information that makes assumptions that contradict decisions that have already been made in the prior messages. Further, the new message recipients may lack sufficient context to understand the meaning of the new messages and/or prior messages. The message recipients that are removed from a new message may be unaware of continuing discussions in the new message. As a result, message recipients that are added and removed from a number of messages may be confused or unware of the discussions taking place in the number of messages.

The principles described herein include a system and method for controlling access to categorized messages. Such a system and method include categorizing a message into a number of categories according to a message objective. The message objective informs user association, message association, and message access rules for each of the number of categories. The system and method includes determining, based on the message objective, a number of users allowed access to the message. Further, the system and method includes allowing the number of users to access the message according to the message objective. As a result, the number of users that are permitted access to the messages based on a message objective can benefit from activity outside of the single message. A user will have access to additional messages received both before and after the message, allowing a user to have a better context and understanding of the message.

In the present specification and in the appended claims, the term "message" means an electronic communication sent by a message originator to a number of message recipients. Messages may include electronic mail (email), text messages, instant messages (IM), and digitally recorded voice messages.

In the present specification and in the appended claims, the term "message objective" means a set of rules that determines how a message is shared between a number of users. A message objective may be defined by a set of default rules or a set of rules associated with a message. A message objective may change based on messages sent in response to other messages.

In the present specification and in the appended claims, the term "access" means granting a number of users the ability to retrieve, obtain, or view a message. A user that gains access to a message is able to view, observe, or read the message. A user that fails to gain access to a message is not able to view, observe, or read the message.

In the present specification and in the appended claims, the term "message originator" means a user that creates a message. A message originator may cause a message to be conveyed, via a network, to at least one message recipient.

In the present specification and in the appended claims, the term "message recipient" means a user that receives a message from a message originator. A message recipient may be specified by a user identifier or an alias that sends the message.

In the present specification and in the appended claims, the term "user association" means a relationship between a user and a message or group of messages. The user association determines users that are given access to a message.

In the present specification and in the appended claims, the term "message access rule" means a set of regulations or principles governing access to a message. A message access rule identifies a number of users that are allowed access to a message. Further, a message access rule defines conditions that the identified users meet when the message was accessed.

In the present specification and in the appended claims, the term "message association" means a grouping or relationship between a message and other messages. Messages that are associated with each other may share a message objective, a number of user associations, or a combination or portions thereof.

As used in the present specification and in the appended claims, the term "a number of" or similar language includes any positive number, including one to infinity; zero not being a number, but the absence of a number.

In the following description, for purposes of explanation, numerous specific details are set forth in order to provide a thorough understanding of the present systems and methods. It will be apparent, however, to one skilled in the art, that the present apparatus, systems, and methods may be practiced without these specific details. Reference in the specification to "an example" or similar language means that a particular feature, structure, or characteristic described in connection with that example is included as described, but may not be included in other examples.

Referring now to the figures, FIG. 1 is a diagram of a message access system (100) for controlling access to categorized messages, according to one example of the principles described herein. As will be described below, the system of FIG. 1 includes an access controller. The access controller categorizes a message into a number of categories according to a message objective. The access controller determines, based on the message objective, a number of users allowed access to the message. Further, the access controller allows the number of users to access the message according to the message objective.

As illustrated, the system (100) includes a number of messages (101). The messages include message A (101-1) and message B (101-2). Further, each of the messages (101) includes information that is being shared between users (107). The messages (101) may share the information with a messaging system. The information may include how to deliver the messages (101) to message recipients. Further, the messages (101) provides information to an access controller (110) about the origin and delivery of the objective.

Further, each of the messages (101) includes a number of fields. The number of fields includes a message originator (102), message recipients (103), categories (104), message objectives (105), and message content (106). As illustrated, each of the messages (101) includes the field for a message originator (102). The message originator (102) is a user that creates the message. For example, the field for the message originator (102-1) of message A (101-1) specifies user A (107-1) is the message originator. The field for the message originator (102-2) of message B (101-2) specifies user B (107-2) is the message originator.

Each of the messages (101) includes the field for a number of message recipients (103). The message recipients (103) may be specified by identifying a user directly or by providing an alias for the users (107). The message recipients (103) may indicate the messages (101) are directed to a user (107). A message recipient may indicate a user is to receive a carbon-copy of the messages (101). A message recipient may indicate a user is to receive a blind carbon-copy of the messages (101). A blind carbon-copy suppresses to other users that a user is to receive the messages (101). As illustrated, the field for the message recipients (103-1) of message A (101-1) specifies user B (107-2) and user C (107-3) are the message recipients. The field for the message recipients (103-2) of message B (101-2) specifies user C (107-3) and user D (107-4) are the message recipients.

Further, each of the messages (101) includes the field for categories (104). The categories (104) may be specified by the message originators (102) or may be derived based on information in the messages (101). As illustrated, the field for the categories (104-1) of message A (101-1) specifies category A (108-1) and category B (108-2) are the categories. Further, the field for the categories (104-2) of message B (101-2) specifies category B (108-2) and category C (108-3) are the categories.

Further, each of the messages (101) includes the field for message objectives (105). The field of the message objectives (105) informs the access controller (110) about user association rules, message association rules, and message access rules for each of a number of categories (104). The message objectives (105) inform the access controller (110) what access is to be provided for each of the messages (101). As illustrated, the field for the message objective (105-1) of message A (101-1) specifies allow more (109-1) and share (109-2) are the message objectives. Further, the field for the message objective (105-2) of message B (101-2) specifies share (109-2) is the message objective. More information about the message objectives (105) will be described below.

Each of the messages (101) further includes the field for message content (106). The field of the message content (106) represents the message from the message originator (102) sent to the message recipients (103). The message may be the body of an email, the body of an IM, the content of a digitally recorded voice message, or similar message data. As illustrated, the field for the message content (106-1) of message A (101-1) specifies content A (111-1) is the message content. Further, the field for the message content (106-2) of message B (101-2) specifies content B (111-2) is the message content.

Further, the system (100) includes an access controller (110). The access controller (110) provides access to the messages (101) based on the number of message objectives (105). In one example, the access controller (110) includes a processor (123), memory (124), and computer program code (122). The memory and the computer program code (122) are communicatively coupled to the processor (123). The computer program code includes a number of engines (114). The engines (114) refer to program instructions for performing a designated function. The computer program code causes the processor to execute the designated functions of the engines (114). In other examples, the engines (114) refer to a combination of hardware and program instructions to perform a designated function. Each of the engines (114) may include a processor and memory. The program instructions are stored in the memory and cause the processor to execute the designated function of the engine. As illustrated, the access controller (110) includes a categorizing engine (114-3), a determining engine (114-4), and an allowing engine (114-5).

The categorizing engine (114-3) categorizes a message into a number of categories (108) according to a message objective. The message objective provides information about user association, message association, and message access rules for each of the number of categories (108). In this example, message A (101-1) includes a message objective (105-1). The message objective (105-1) indicates that the allow more (109-1) message objective and the share (109-2) message objective are enabled. The allow more (109-1) message objective allows additional messages to be associated with a message by the categorizing engine (114-3) after the message is sent, without obtaining further approval from a message originator. Additional categories may be associated with a message by the categorizing engine (114-3) in response to a new message sent in response to an earlier message. For example, the allow more (109-1) message objective allows additional messages and categories to be associated with a message by the categorizing engine (114-3). The allow more (109-1) message objective serves as permission to group categories and messages without additional input from a message originator or message recipient. Additional messages may be grouped or categorized to include replies to a message sent. The share (109-2) message objective allows message B (101-2) to be shared with users in addition to the message originator (102-2) and the message recipients (103-2). As illustrated, the categorizing engine (114-3) categorizes message A (101-1) into category A (108-1) and category B (108-2) according to the allow more (109-1) and the share (109-2) message objectives. Further, the categorizing engine (114-3) categorizes message B (101-2) into category B (108-2) and category C (108-3) according to the share (109-2) message objective.

The determining engine (114-3) determines, based on the message objective, a number of users allowed access to the message. In this example, the determining engine (114-3) determines user A (107-1), user B (107-2), and user C (107-3) may be provided access to message A (101-1). Further, additional users may receive access to message A (101-1) based on the message objective (105-1) and the message categories (104-1). Further, the determining engine (114-3) determines user B (107-2), user C (107-3), and user D (107-4) may be provided access to message B (101-1).

The allowing engine (114-5) allows the number of users to access the message according to the message objective. In keeping with the given example, the allowing engine (114-5) allows user A (107-1), user B (107-2) and user C (107-3) to access message A (101-1). As a result, user A (107-1), user B (107-2), and user C (107-3) are allowed users for message A (101-1). Further, the allowing engine (114-5) allows user B (107-2), user C (107-3), and user D (107-4) to access message B (101-2). As a result, user B (107-2), user C (107-3), and user D (107-4) are allowed users for message B (101-2).

The access controller (110) may store the number of messages and provide access to the messages to the allowed users. The access controller (110) may send a message to each of the allowed users. As will be described below, the access controller (110) may provide additional access to message A (101-1) based on additional messages received and based on additional message objectives.

Figure 2:
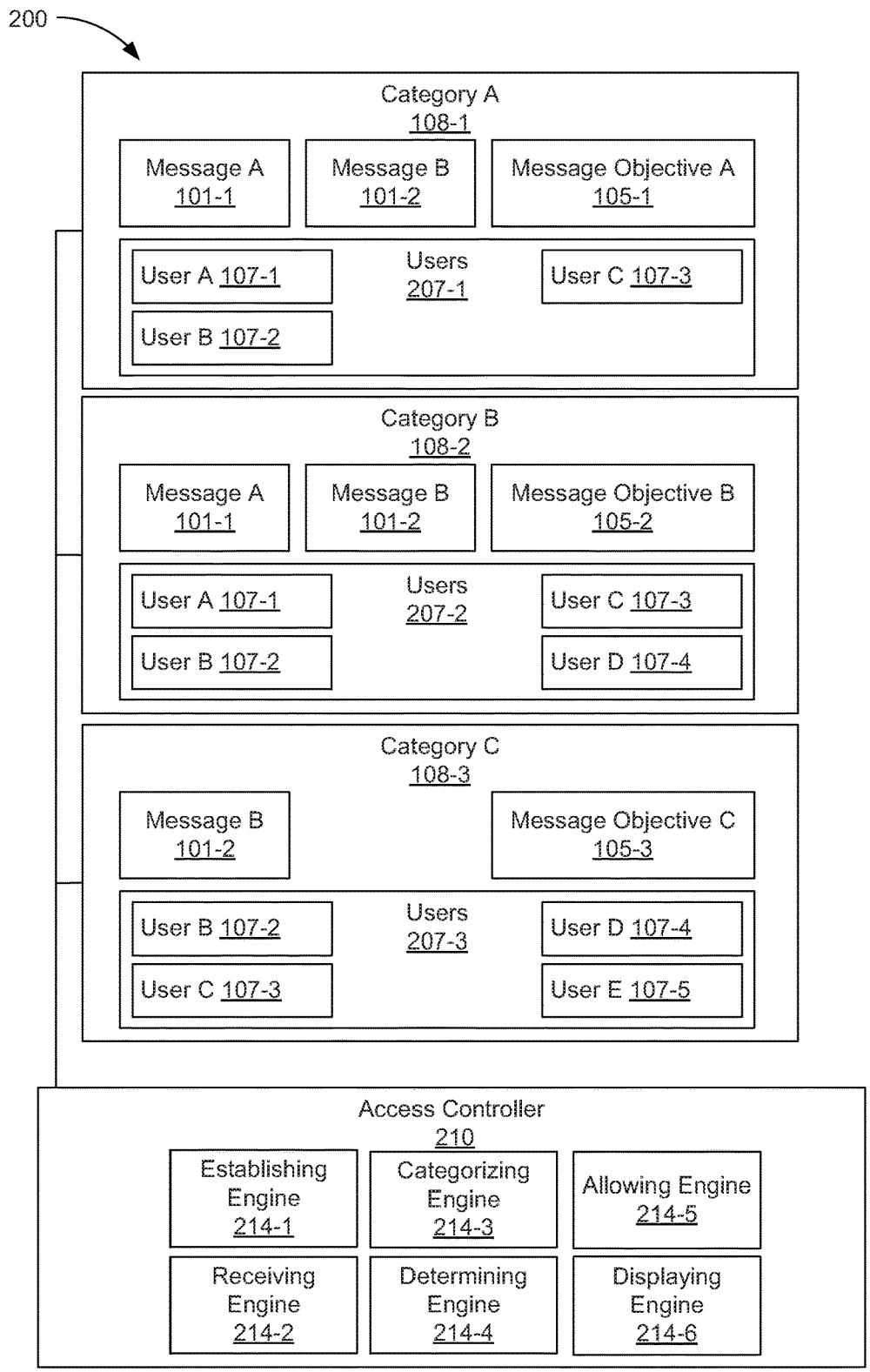
FIG. 2 is a diagram of a system for controlling access to categorized messages, according to one example of the principles described herein.

FIG. 2 is a diagram of a system for controlling access to categorized messages, according to one example of the principles described herein. As will be described below, the system of FIG. 2 includes an access controller. The access controller categorizes a message into a number of categories according to a message objective. The access controller determines, based on the message objective, a number of users allowed access to the message. Further, the access controller allows the number of users to access the message according to the message objective.

In an example, the diagram (200) illustrates a repository for storing a number of messages that can be accessed by the access controller (110). Further, users (107) may access messages in the repository rather than having the message delivered to the users (107). A system for receiving messages may retrieve the messages from the repository so that it appears to the users (107) that the message has been delivered. As illustrated, the diagram (200) includes a number of categories (108). The categories (108) include category A (108-1), category B (108-2) and category C (108-3). Category A (108-1) may be a first category. Further, category A (108-1) is associated with message A (101-1). Category A (108-1) further includes message objective A (105-1). Further, category A (108-1) is associated with a number of users (207-1). The users (207-1) include user A (107-1), user B (107-2), and user C (107-4). As a result, user A (107-1), user B (107-2), and user C (107-4) are users associated with category A (108-1).

Category B (108-2) may be a second category. Category B (108-2) is associated with message A (101-1) and message B (101-2). Category B (108-2) further includes message objective B (105-2). Further, category B (108-2) is associated with a number of users (207-2). The users (207-2) include user A (107-1), user B (107-2), user C (107-3), and user D (107-4). As a result, user A (107-1), user B (107-2), user C (107-3), and user D (107-4) are users associated with category B (108-2).

Category C (108-3) may be a third category. Category C (108-3) is associated with Message B (101-2). Category C (101-3) further includes message objective C (110-3). Further, category C (108-3) is associated with a number of users (207-3). The users (207-3) include user B (107-2), user C (107-3), user D (107-4), and user E (107-5). As a result, user B (107-2), user C (107-3), user D (107-4), and user E (107-5) are users associated with category C (108-3).

As illustrated, the diagram (200) includes the access controller (210). As will be described below, the access controller (210) allows users (107) to access the messages (101) based on the message objectives (105). The access controller (210) includes an establishing engine (214-1), a receiving engine (214-2), a categorizing engine (214-3), a determining (214-4), an allowing engine (214-5), and a displaying engine (214-6).

The establishing engine (214-1) establishes, based on a number of messages, a message objective. The message objective informs user association, message association, and message access rules for each of a number of categories (108). The establishing engine (214-1) may use data received with the messages (101) to establish message objectives (105) for each of the messages (101). The establishing engine (214-1) may reference additional data and message objectives (105) to include prior activity of the access controller (210). The message objective (105) informs the access controller (210) which users are to be allowed to access messages.

The receiving engine (214-2) receives a change to the message objective (105). A change to the message objective (105) may be received from a user or from an application to change the message objective. In one example, a request generated by a user interface allows a user to change a message objective (105) by adding or removing users (107) from having access to the message (101). In another example, an application determines that a user has not accessed the message (101) within a specified amount of time and changes the message objective (105) to remove the user from the access list. In still another example, a change to a message objective is determined by analyzing the content of a message. A change to the message objective (105) associated with a message (101) allows for changes to the users (107) allowed to access the message after the message objective has been established.

The categorizing engine (214-3) categorizes the message (101) into the number of categories (108) according to the message objective (105). The categorizing engine (214-2) may group a message with other messages (101). The categorizing engine (214-3) may categorize a number of messages (101) together based into a new category based on semantically similar message content and similar message originators and message recipients. For example, message A (101-1) is a first message for a message topic. Message B (101-2) is a reply to message A (101-1). Message B (101-2) is categorized to at least one category (108) associated with message A (101-1). The categories (108) associated with a message (101) may inform the message objective (105) of message access rules for the message (101). In one example, a message (101) is categorized into a category (108). The category (108) has a number of users (107) associated with the category. As will be described below, the users (107) associated with the category (108) are given access to the message (101).

The determining engine (214-4) determines, based on the message objective (105), a number of users (107) allowed access to the message (105). A message includes a message originator (FIG. 1, 102) and a number of message recipients (FIG. 1, 103). The determining engine (214-4) determines that the message originator (FIG. 1, 102) and the number of message recipients (FIG. 1, 103) are allowed access. In one example, user A (107-1) sends a message (101-1), such as an email, to a user B (107-2) and user C (107-3) destined to receive the email. Further, user B (107-2) is a message recipient of message A (101-1). As a result, the determining engine (214-4) determines that the message originator (FIG. 1, 102-1), user A (107-1), and the message recipient (FIG. 1, 102-2), user B (107-2), are able to access the message.

The allowing engine (214-5) allows the number of users (107) to access the message (101) according to the message objective (105). The allowing engine (214-5) may allow the number of users (107) to access additional messages (107) associated with the message. The allowing engine (214-5) allows users access to additional messages that may be received either before or after a message (101). The allowing engine (214-5) may allow a user (107) access to a category (108) when a user (107) registers interest in the category (108). The user (107) may be allowed to register interest in a category (108) even when the user is not a message originator (FIG. 1, 102) or a message recipient (FIG. 1, 103). A user (107) that registers interest in a category (108) or message (101) will follow activity with the category or the message. For example, when a reply to a message (101) is processed, received, or sent for a message being followed, the allowing engine (214-5) may determine that the following user has access to the reply. The reply is then accessible to following user as if they had been addressed on the message. A message originator (FIG. 1, 102) may see a list of users (107) who will have access to a message, and may see an indication as to the categories which grant access to a user that is following a category (108) or message (101). The message originator (FIG. 1, 102) may take an action to remove the category (108) or message (101) when the message originator needs to limit access to the category (108) or message (101). A user (107) may be allowed to remove users from access to a category (108) to limit the number of users that may have access to the message. In one example, message A (101-1) is sent from a message originator (FIG. 1, 102-1) to a number of message recipients (FIG. 1, 103-1), one of the message recipients may respond to the message originator (FIG. 1, 102-1), as a reply to message A (FIG. 1, 101-1), with message B (101-2), while excluding other message recipients. As a result of the message objective (105-1), the allowing engine (214-5) allows the other message recipients to access message B (101-2).

The displaying engine (214-6) displays the message (101) to the number of users (107) allowed access to the message. The displaying engine (214-6) may present the messages (101) in a message client, such as an email client. The message client may appear to store the messages on a system associated with a user. A user (107) that is allowed access to a message may have the message displayed via the displaying engine (214-6). The displaying engine (214-6) causes a message to be displayed to a user who is allowed access to the message. The displaying engine (214-6) may interact with a message agent, such as an email client, to cause the message to be displayed to a user on a display. The displaying engine (214-6) may cause the messages to be displayed so that the messages appear to reside on a device associated with a user.

A number of examples will now be given with reference to FIG. 2. In a first example, message objective A (105-1) is established in association with message A (101-1) by the establishing engine (214-1). Message A (101-1) is categorized by the categorizing engine (214-3) into category A (108-1). Message objective A (105-1) informs the user association, message association, and message access rules for category A (108-1). Message objective A (105-1) is used to determine, by the determining engine (214-4), that user A (107-1), user B (107-2) and user C (107-3) are allowed access to message A (101-1). As a result, user A (107-1), user B (107-2) and user C (107-3) are determined to be allowed access to message A (101-1).

In a second example, message objective B (105-2) is established in association with message B (101-2) by the establishing engine (214-1). The receiving engine (214-2) receives a change to the message objective B (105-2). The change to message objective B (105-2) allows user D (107-4) to access messages in category B (108-2). Message A (101-1) is categorized, by the categorizing engine (214-3), into category B (108-2). Similarly, message B (101-2) is categorized, by the categorizing engine (214-3), into category B (108-2). The users are determined, by a determining engine (214-4), to be allowed access to message A (101-1). The users (207-2) include user A (107-1), user B (107-2), user C (107-3), and user D (107-4). The users (207-2) include the cumulative message originators (FIG. 1, 102) and message recipients (FIG. 1, 103) of message A (101-1) and message B (101-2). Further, the users (207-2) include users that have different affiliations with category B (108-2). The allowing engine (214-5) allows the users (207-2) to access message A (101-1) and message B (101-2).

In a third example, message objective C (105-3) is established, by the establishing engine (214-1), based on message B (101-2). Message B (101-2) is categorized, by the categorizing engine (214-2), to category C (108-3). It is determined, by the determining engine (214-3) that users are to be given access to message B (101-2). User B (107-2) is the message originator (FIG. 1, 102-2) of message B (101-2). User C (107-3) and user D (107-4) are message recipients (FIG. 1, 103-2) of message B (101-2). In addition to user B (107-2), user C (107-3), and user D (107-4) being allowed access to message B (101-2), user E (107-5) is also allowed to have access to message B (101-2). User E (107-5) is not a message originator (FIG. 1, 102-2) or a message recipient (FIG. 1, 103-2). However, user E (107-5) is a user associated with category C (108-3). User E (107-5) may have participated in previous correspondence about category C (108-3). Further, user E (107-5) may have managerial duties over category C (108-3). User E (107-5) may have responsibility over activity associated with category C (108-3). As a result, the allowing engine (214-5) allows the users (207-3) to access message B (101-2).

Further, a message may be associated with a number of categories. A user is allowed to access a message through a user account. Each user account allowed access to a message may access the messages associated with that user account. A user account may be associated with a message through a number of categories. A user with a user account may be granted access to a message through a number of associations with the message.

Figure 3:
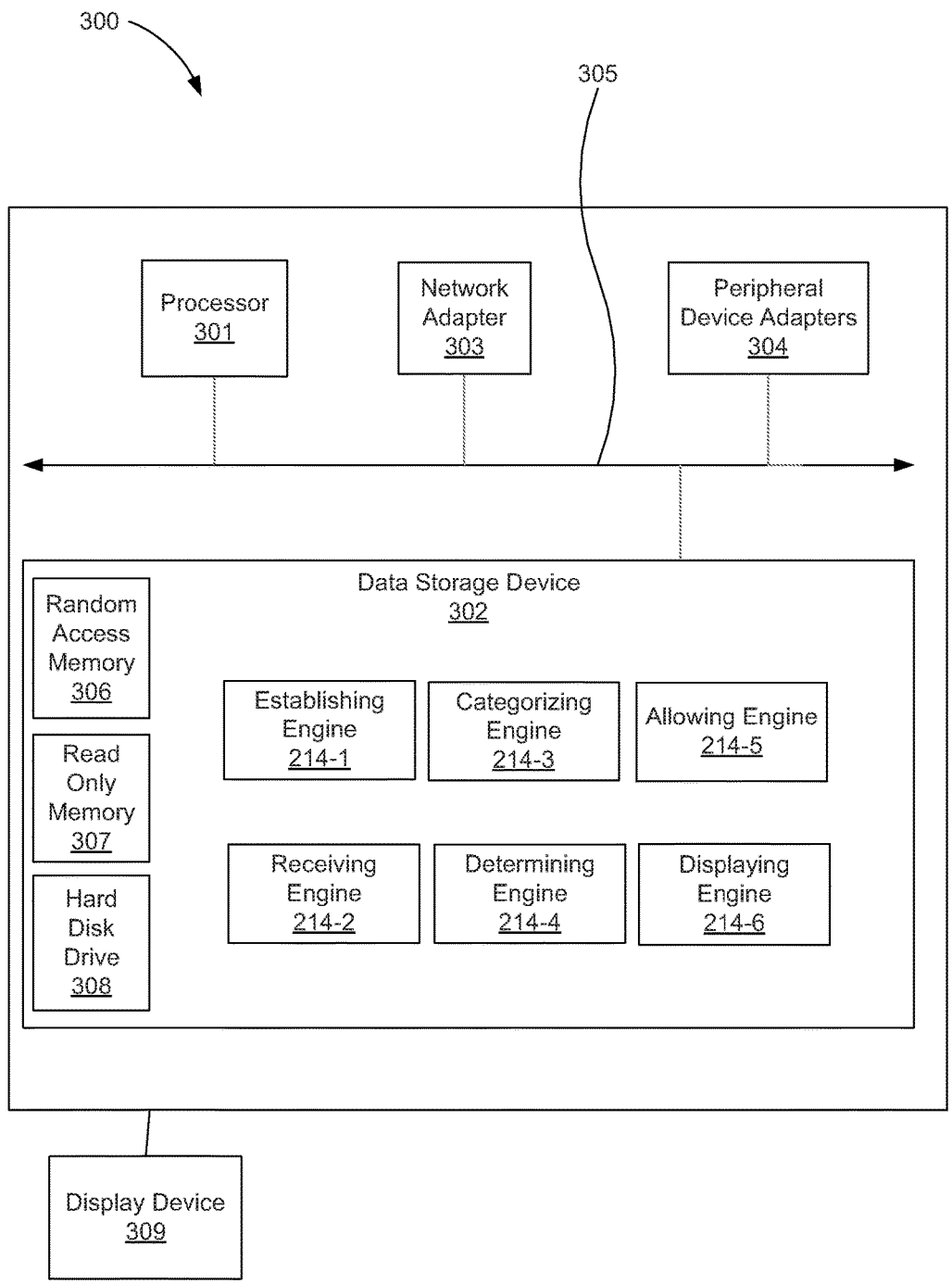
FIG. 3 is a diagram of a system for controlling access to categorized messages, according to the principles described herein.

FIG. 3 is a diagram of a system for controlling access to categorized messages, according to one example of the principles described herein. The access controller (300) for providing access to categorized messages may be implemented as an electronic device. Examples of electronic devices include servers, desktop computers, laptop computers, personal digital assistants (PDAs), mobile devices, smartphones, gaming systems, and tablets, among other electronic devices.

The access controller (300) may be utilized in any data-processing scenario, including stand-alone hardware, mobile applications, a computing network, or combinations thereof. Further, the access controller (300) may be used in a computing network, a public cloud network, a private cloud network, a hybrid cloud network, other forms of networks, or combinations thereof. In one example, the methods provided by the access controller (300) are provided as a service over a network by, for example, a third party. In this example, the service may comprise, for example, the following: a Software as a Service (SaaS) hosting a number of applications; a Platform as a Service (PaaS) hosting a computing platform comprising, for example, operating systems, hardware, and storage, among others; an Infrastructure as a Service (IaaS) hosting equipment such as, for example, servers, storage components, networks, and components, among others; application program interface (API) as a service (APIaaS), other forms of network services, or combinations thereof. The present systems may be implemented on one or multiple hardware platforms, in which the engines in the system can be executed on one or across multiple platforms. Such engines can run on various forms of cloud technologies and hybrid cloud technologies or offered as a SaaS (Software as a service) that can be implemented on or off the cloud. In another example, the methods provided by the access controller (300) are executed by a local administrator.

To achieve its desired functionality, the access controller (300) may include various hardware components. Among these hardware components may be a number of processors (301), a number of data storage devices (302), a number of peripheral device adapters (304), and a number of network adapters (303). These hardware components may be interconnected through the use of a number of buses and/or network connections. In one example, the processor (301), data storage device (302), peripheral device adapters (304), and a network adapter (303) may be communicatively coupled via a bus (305).

The data storage device (302) may store data, such as executable program code, that is executed by the processor (301) or other processing device. As will be discussed, the data storage device (302) may specifically store computer code representing a number of applications that the processor (301) executes to implement at least the functionality described herein.

The data storage device (302) may include various types of memory modules, including volatile and nonvolatile memory. For example, the data storage device (302) of the present example includes Random Access Memory (RAM) (306), Read Only Memory (ROM) (307), and Hard Disk Drive (HDD) memory (308). Many other types of memory may also be utilized, and the present specification contemplates the use of as many varying type(s) of memory in the data storage device (302) as may suit a particular application of the principles described herein. In certain examples, different types of memory in the data storage device (302) may be used for different data storage needs. For example, in certain examples, the processor (301) may boot from Read Only Memory (ROM) (307), maintain nonvolatile storage in the Hard Disk Drive (HDD) memory (308), and execute program code stored in Random Access Memory (RAM) (306).

Generally, the data storage device (302) may comprise a computer readable medium, a computer readable storage medium, or a non-transitory computer readable medium, among others. For example, the data storage device (302) may be, but is not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store computer usable program code for use by, or in connection with, an instruction execution system, apparatus, or device. In another example, a computer readable storage medium may be any non-transitory medium that can contain or store a program for use by, or in connection with, an instruction execution system, apparatus, or device.

The hardware adapters (303, 304) in the access controller (300) enable the processor (301) to interface with various other hardware elements, external and internal to the computing device (300). For example, the peripheral device adapters (304) may provide an interface to input/output devices, such as, for example, a display device (309), a mouse, or a keyboard. The peripheral device adapters (303) may also provide access to other external devices, such as an external storage device, a number of network devices such as, for example, servers, switches, and routers, client devices, other types of computing devices, and combinations thereof.

The display device (309) may be provided to allow a user of the computing device (300) to interact with and implement the functionality of the access controller (300). The peripheral device adapters (304) may also create an interface between the processor (301) and the display device (309), a printer, or other media output devices. The network adapter (303) may provide an interface to other computing devices within, for example, a network, thereby enabling the transmission of data between the access controller (300) and other devices located within the network.

The access controller (300) may, when executed by the processor (301), display the number of graphical user interfaces (GUIs) on the display device (309) associated with the executable program code, representing the number of applications stored on the data storage device (302). The GUIs may include aspects of the executable code, including displaying messages to which a user has been allowed access. A user that is not allowed access is not able to view the messages. Examples of display devices (309) include a computer screen, a laptop screen, a mobile device screen, a personal digital assistant (PDA) screen, and a tablet screen, among other display devices (309). Examples of the GUIs displayed on the display device (309) will be described in more detail below.

The access controller (300) may include a number of engines used in the implementation of the electronic message presenting system. The various engines within the access controller (300) comprise executable program code that may be executed separately. In this example, the various engines may be stored as separate computer program products. In another example, the various engines within the access controller (300) may be combined within a number of computer program products, each computer program product comprising a number of the engines.

Aspects of the present system and method are described herein with reference to flowchart illustrations and/or block diagrams of methods, apparatus (systems) and computer program products, according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor (301) of the access controller (300) or other programmable data processing apparatus, implements the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The access controller (300) includes an establishing engine (214-1). The establishing engine (214-1) establishes, based on a number of messages associated with a category, a message objective. The message objective informs the access controller (300) of the rules for allowing access to the messages. The establishing engine (214-1) may associate the message objective with the messages. The establishing engine (214-1) may associate the message objective with a category associated with the messages. The establishing engine (214-1) may establish, based on information in the message, a message objective. The establishing engine (214-1) may establish, based on information about other messages and data associated with the access controller (300), a message objective.

The access controller (300) includes a receiving engine (214-2). The receiving engine (214-2) receives changes to the message objective. A user or application may change the message objective. The receive engine (214-2) receives a change and applies the change to the message objective. The receive engine (214-2) may receive a portion of a message objective. When a portion of a message objective is received, the portion of the message objective received is updated in the message objective, leaving the remainder of the message objective unchanged. The receive engine (214-2) may receive a change such as a replacement message objective. The replacement message objective replaces all aspects of the message objective.

The access controller (300) includes a categorizing engine (214-3). The categorizing engine (214-3) categorizes the message into a number of categories according to the message objective. The categorizing engine (214-3) may create a category wherein the message is categorized. The categorizing engine (214-3) may categorize the message in a category that was previously created. The categorizing engine (214-3) may change a message objective based on the content of a message (101) being categorized. In one example, message A (101-1) is categorized into category B (108-2). Category B (108-2) has message objective B (105-2). Message B (101-2) is received and categorized into category B (108-2). The categorizing engine (214-3) updates message objective B (105-2) based on the content of message B (101-2). The update includes associating user D (107-4) with category B (108-2). A category may be associated with a number of different messages. A category may be associated with a number of different users.

The access controller (300) includes a determining engine (214-4). The determining engine (214-4) determines, based on the message objective, a number of users that are allowed access to the message. The users that are allowed access to the message may be specified in the message. The users that are allowed access to the message may be associated with a category in which the message is categorized. The determining engine (214-4) may use additional data to determine a user or users that are allowed access to the message. The determining engine (214-4) may determine a number of additional users that are associated with a message objective that are allowed access to the message. In one example, a message originator (FIG. 1, 102-2) for message B (101-2) is user B (107-2). Message B (101-2) includes user C (107-3) and user D (107-4) as message recipients. Message B (101-2) is categorized in category B (108-2) and category C (108-3). As mentioned above, users of the categories (108) are allowed to access the messages (101). In this example, in addition to user B (107-2), user C (107-3), and user D (107-4) are message originators and message recipients. Further, User A (107-1) and user E (107-5) are additional users allowed to access message B (101-2) through the message objectives (105) and the message category (108). In another example, message B (101-2) is a reply to message A (101-1). User A (107-1) is removed as a recipient of message B (101-2). User B (107-2) is the message originator (FIG. 1, 102-2). User A (107-1) is allowed access to message B (101-2) even though user A (107-1) is not a message recipient.

The access controller (300) includes an allowing engine (214-5). The allowing engine (214-5) allows the number of users to access the message according to the message objective. The number of users allowed to access the message is the users that were determined to be allowed access to the message by the determining engine (214-4). The allowing engine (214-5) may allow an application associated with a user to retrieve the message.

The access controller (300) includes a displaying engine (214-6). The displaying engine (214-6) displays the message to the number of users allowed to access the message. The number of users may be approved users. The displaying engine (214-6) may display a message on a display (309). The displaying engine (214-6) may interact with a message client to display a message to the number of users. The displaying engine (214-6) may cause the message client to display the message.

An example of the access controller (300) controlling access to categorized message will now be given. The access controller (300) establishes, via the establishing engine (214-1) message objective A (FIG. 1, 105-1) based on message A (FIG. 1, 101-1). Message objective A (FIG. 1, 105-1) is used to determine the users associated with message A (FIG. 1, 101-1), the association of other messages with message A, and access rules associated with message A. Message objective A (FIG. 1, 105-1) indicates that a message originator and message recipients of message A are to be allowed access to message A.

The receiving engine (214-2) receives a change, such as an update, to message objective A (FIG. 1, 105-1). The change allows a user to allow or restrict other users from accessing message A (FIG. 1, 101-1).

The categorizing engine (214-3) categorizes message A (FIG. 1, 101-1) into a number of categories. Message A (FIG. 1, 101-1) is categorized into category A (FIG. 2, 108-1) and category B (FIG. 2, 108-2). The categories (FIG. 2, 108-1 and 108-2) are associated with message objective A (FIG. 1, 105-1), message objective B (FIG. 1, 105-2) and a number of category users (FIG. 2, 207-1, 207-2).

The determining engine (214-4) determines that user A (FIG. 2, 107-1), user B (FIG. 2, 107-2), and user C (FIG. 2, 107-3) are allowed access to message A (FIG. 2, 101-1) through category A (FIG. 2, 108-1). The determining engine (214-4) determines that user A (FIG. 2, 107-1), user B (FIG. 2, 107-2), user C (FIG. 2, 107-3), and user D (FIG. 2, 107-4) are allowed access to message A (FIG. 2, 101-1) through category B (FIG. 2, 108-2). As a result, user A (FIG. 2, 107-1), user B (FIG. 2, 107-2), user C (FIG. 2, 107-3), and user D (FIG. 2, 107-4) are allowed access to message A (FIG. 2, 101-1).

The allowing engine (214-5) allows user A (FIG. 2, 107-1), user B (FIG. 2, 107-2), user C (FIG. 2, 107-3), and user D (FIG. 2, 107-4) access to access the message A (FIG. 2, 101-1). As a result, user A (FIG. 2, 107-1), user B (FIG. 2, 107-2), user C (FIG. 2, 107-3), and user D (FIG. 2, 107-4) are allowed to retrieve, obtain, or view message A (FIG. 2, 101-1).

The access controller (300) may operate on a number of messages. After the access controller (300) operates on message A (FIG. 2, 101-1), the access controller operates on message B (FIG. 2, 101-2). The access controller (300) uses information associated with message A (FIG. 2, 101-1) to provide access to message B (FIG. 1, 101-2).

The categorizing engine (214-3) categorizes message B (FIG. 1, 101-2) into a number of categories. Message B (FIG. 1, 101-2) is categorized into category B (FIG. 2, 108-2) and category C (FIG. 2, 108-3). The categories are associated with message objective A (FIG. 1, 105-1), message objective B (FIG. 1, 105-2), message objective C (FIG. 1, 105-3), and a number of category users (FIG. 2, 207-1, 207-2).

The determining engine (214-4) determines that user A (FIG. 2, 107-1), user B (FIG. 2, 107-2), and user C (FIG. 2, 107-3) are allowed access to message B (FIG. 1, 101-1) through category A (FIG. 2, 108-1). The determining engine (214-4) determines that user A (FIG. 2, 107-1), user B (FIG. 2, 107-2), user C (FIG. 2, 107-3), and user D (FIG. 2, 107-4) are allowed access to message B (FIG. 2, 101-2) through category B (FIG. 2, 108-2). The determining engine (214-4) determines that user B (FIG. 2, 107-2), user C (FIG. 2, 107-3), user D (FIG. 2, 107-4), and user E (FIG. 2, 107-5) are allowed access to message B (FIG. 1, 101-2) through category C (FIG. 2, 108-3). User E (FIG. 2, 107-5) is associated with category C (FIG. 2, 108-3) through interaction with the subject matter of category C (FIG. 2, 108-3). As a result, user A (FIG. 2, 107-1), user B (FIG. 2, 107-2), user C (FIG. 2, 107-3), and user D (FIG. 2, 107-4) are allowed access to message B (FIG. 1, 101-1).

Figure 4:
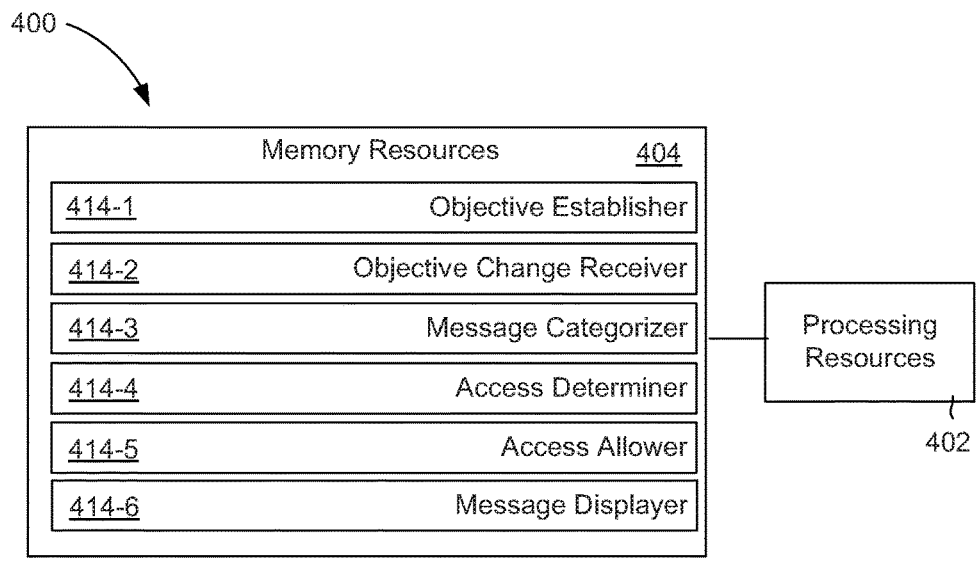
FIG. 4 is a diagram of an access controller, according to one example of the principles described herein.

FIG. 4 is a diagram of an example of an access controller (400), according to the principles described herein. In this example, the access controlling system (400) includes processing resources (402) that are in communication with memory resources (404). Processing resources (402) include at least one processor and other resources used to process programmed instructions. The memory resources (404) generally represent any memory capable of storing data, such as programmed instructions or data structures used by the message presenting system (400). The programmed instructions shown stored in the memory resources (404) include an objective establisher (414-1), an objective change receiver (414-2), a message categorizer (414-3), an access determiner (414-4), an access allower (414-5), and a message displayer (414-6).

The memory resources (404) include a computer readable storage medium that contains computer readable program code to cause tasks to be executed by the processing resources (402). The computer readable storage medium may be a tangible and/or physical storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, other types of memory, or combinations thereof.

The objective establisher (414-1) represents programmed instructions that, when executed, cause the processing resource (402) to establish, based on a number of messages associated with one of the categories, a message objective. The message objective informs user association, message association, and message access rules associated for each of the number of categories.

The objective change receiver (414-2) represents programmed instructions that, when executed, cause the processing resource (402) to receive a change to the message objective. The change to the message objective may update a portion of the message objective. The change to the message objective may update all of the message objectives.

The message categorizer (414-3) represents programmed instructions that, when executed, cause the processing resource (402) to categorize the message into a number of categories according to the message objective. Categorizing the message associates the message with a number of message objectives.

The access determiner (414-4) represents programmed instructions that, when executed, cause the processing resource (402) to determine, based on the message objective, a number of users allowed access to the message. The access determiner (414-4) may reference the message, one of the categories, or the message objective to determine the number of users that are allowed access to the message.

The access allower (414-5) represents programmed instructions that, when executed, cause the processing resource (402) to allow the number of users to access the message according to the message objective. A user that is allowed access to the message may access the message. As a result, the access allower (414-5) provides a user the ability to access the message.

The message displayer (414-6) represents programmed instructions that, when executed, cause the processing resource (402) to display the message to the number of users allowed access to the message. The message displayer (414-6) may interact with a messaging system, such as an email client, to cause the message to be displayed.

Further, the memory resources (404) may be part of an installation package. In response to installing the installation package, the instructions of the memory resources (404) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resource(s) (402) and the memory resources (404) are located within the same physical component, such as a server, or a network component. The memory resources (404) may be part of the physical component's main memory, caches, registers, non-volatile memory, or elsewhere in the physical component's memory hierarchy. Alternatively, the memory resources (404) may be in communication with the processing resource(s) (402) over a network. Further, the data structures, such as the libraries, may be accessed from a remote location over a network connection while the programmed instructions are located locally. Thus, the access controller (400) may be implemented on a user device, on a server, on a collection of servers, or combinations thereof.

The access controller (400) of FIG. 4 may be part of a general purpose computer. However, in an alternative example, the access controller (400) is part of an application specific integrated circuit.

Figure 5:
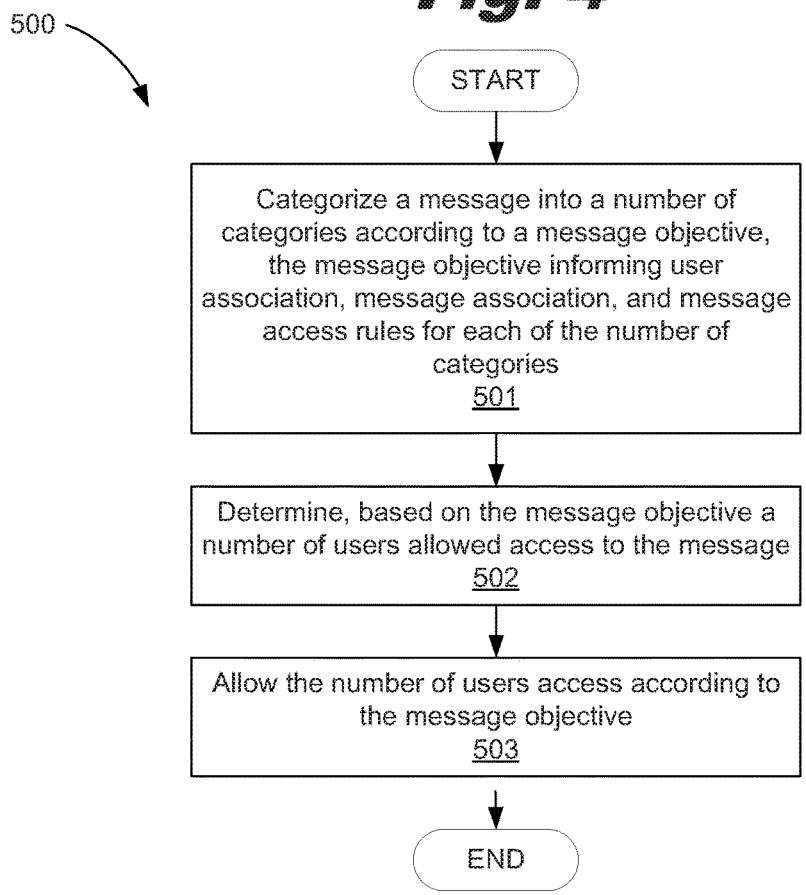
FIG. 5 is a flowchart of a method for controlling access to categorized messages, according to one example of principles described herein.

FIG. 5 is a flowchart of an example of a method for controlling access to categorized messages, according to one example of principles described herein. The method (500) may be executed by the access controller (110) of FIG. 1. The method (500) may be executed by other systems (i.e. system 210, system 300, and system 400). In this example, the method (500) includes categorizing (501) a message into a number of categories according to a message objective, the message objective informing user association, message association, and message access rules for each of the number of categories, determining (502), based on the message objective, a number of users allowed access to the message, and allowing (503) the number of users to access the message according to the message objective.

As mentioned above, the method (500) includes categorizing (501) a message into a number of categories according to a message objective. The message objective informing user association, message association, and message access rules for each of the number of categories. A user associated with a message is allowed to access the message. A message may be associated with a number of other messages, allowing users to access the messages that are associated. A number of messages may be associated with a message objective. Message access rules are a set of regulations or principles governing access to a message. A number of messages associated with each other are a message category. The categorizing (501) may categorize a message into a number of categories. Each category includes a number of messages. The categorizing (501) may re-categorize messages previously categorized. For example, when the allow more (FIG. 1, 101) message objective is set, the categorizing (501) may categorize a message that is received, as well as categorizing a number of previously categorized messages.

The message objective may be received as part of a message. A number of message objectives may be associated with a number of categories. A message may be categorized according to a number of message objectives associated with a number of categories.

As mentioned above, the method (500) includes determining (502), based on the message objective, a number of users allowed access to the message. The message objective may inform the method (500) of users that are to be associated with the message. The message objective may inform the method (500) that users associated with a category are allowed access to a message. The message objective may inform the method (500) that a number of users are not allowed access to a message.

As mentioned above, the method (500) includes allowing (503) the number of users access to the message according to the message objective. The message objective may specify criteria for a user that is allowed to access the message. In one example, the message objective may specify a security protocol to access the message. The message objective may specify that a message may be accessed using an encrypted protocol. In another example, the message objective may specify a time interval that the message may be accessed by the number of users.

Figure 6:
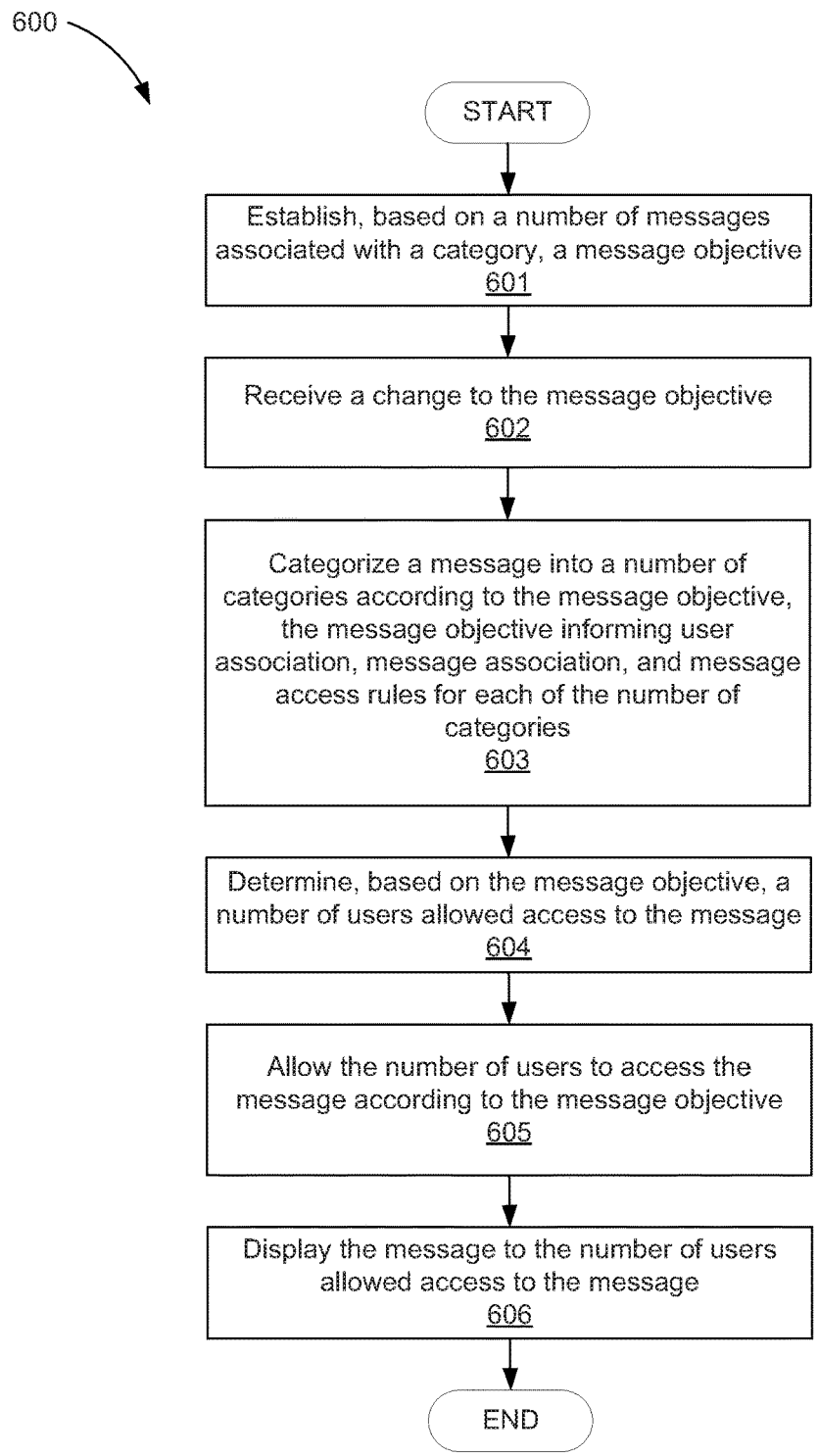
FIG. 6 is a flowchart of a method for controlling access to categorized messages, according to one example of principles described herein.

FIG. 6 is a flowchart of an example of a method for controlling access to categorized messages, according to one example of principles described herein. The method (500) may be executed by the access controller (110) of FIG. 1. The method (600) may be executed by other systems (i.e. system 210, system 300, and system 400). In this example, the method (600) includes establishing (601), based on a number of messages associated with a category, a message objective, receiving (602) a change to the message objective, categorizing (603) a message into a number of categories according to the message objective, the message objective informing user association, message association, and message access rules for each of the number of categories, determining (604), based on the message objective, a number of users allowed access to the message, publishing (605) the message to a number of users, allowing (606) the number of users to access the message according to the message objective, and displaying (607) the message to the number of users allowed to access the message.

As mentioned above, the method (600) includes establishing (601), based on a number of messages associated with one of the categories, a message objective. The message objective may be established based on a number of messages associated with one of the categories. The messages may establish a category topic. The category topic is created by categorizing a number of messages to a category. Further, a number of users may be associated with the category.

As mentioned above, the method (600) includes receiving (602) a change to the message objective. A user associated with an objective may elect not to be associated with the message objective. If the user no longer elects to be associated with the message objective, the user would no longer be allowed access to the messages associated with the message objective. Further, a user not associated with a message objective may elect to be associated with the message objective. If the user elects to be associated with the message objective, the user would be allowed to access the messages associated with the message objective.

As mentioned above, the method (600) includes publishing (606) the message. Publishing (606) the message may include receiving, from a message originator, authorization that the users proposed to have access to the message are approved by the message originator. Publishing (606) the message may further include receiving, from a message originator, authorization that the message objectives for a message are approved by the message originator. Publishing (606) the message may further include receiving approval of a portion of the message objectives and users proposed to have access to the message. Publishing (606) the message may further include receiving additional message objectives and users proposed to have access to the message.

As mentioned above, the method (600) includes displaying (607) the message to the number of users allowed access to the message. The method (600) displays the message to all users that are allowed to access the message. The method (600) may interact with a device associated with a user to display the message. The method (600) may format the message for display to the user.

The preceding description has been presented to illustrate and describe examples of the principles described. This description is not intended to be exhaustive or to limit these principles to any precise form disclosed. Many modifications and variations are possible in light of the above teaching.

The flowchart and block diagrams in the figures illustrate the architecture, functionality, and operations of possible implementations of systems, methods, and computer program products. In this regard, each block in the flowchart or block diagrams may represent a module, segment, or portion of code, which has a number of executable instructions for implementing the specific logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combination of blocks in the block diagrams and/or flowchart illustration, can be implemented by special purpose hardware-based systems that perform the specified functions or acts, or combinations of special purpose hardware and computer instructions.

What is claimed is:

1. A method for controlling access to categorized messages, the method comprising:
    establishing, based on a number of electronic messages associated with a category, a message objective, wherein the message objective:
        comprises a set of rules to determine how an electronic message is shared;
        informs user association, message association, and message access rules for each of multiple categories;
        comprises an allow more objective to allow grouping of electronic messages without additional input from a message originator;
        comprises a share objective to allow the electronic message to be shared with users in addition to the message originator and a message recipient; and
        wherein an electronic message comprises a categories field and a message objectives field;
    receiving a change to the message objective;
    categorizing the electronic message into a number of categories according to the message objective, wherein each category comprises a number of electronic messages;
    grouping the electronic messages with other electronic messages in the multiple categories based on semantically similar message content;

determining, based on the message objective, a number of users allowed access to the electronic message;

removing a first user from the number of users allowed access to the electronic message based on the first user having not accessed the electronic message within a specified amount of time;

adding a second user to the number of users allowed access to the electronic message by receiving a request from the second user registering interest in a category; and allowing the number of users to access the electronic message according to the message objective.

2. The method of claim 1, wherein receiving a change to the message objective comprises analyzing the content of the electronic message to determine the change to the message objective.

3. The method of claim 1, wherein receiving the change to the message objective comprises receiving a request from a user to be associated with the message objective.

4. The method of claim 1, wherein receiving the change to the message objective comprises receiving a request from a user to not be associated with the message objective.

5. The method of claim 1, wherein receiving the change to the message objective is received as part of the electronic message.

6. The method of claim 1, wherein the electronic message comprises a message originator and a number of message recipients.

7. The method of claim 6, wherein determining, based on the message objective, the number of users allowed to access the electronic message comprises determining that the message originator and the number of message recipients are allowed access to the electronic message.

8. The method of claim 1, wherein determining, based on the message objective, the number of users allowed to access the electronic message comprises determining a number of additional users that are associated with a message objective to be allowed access to the electronic message.

9. The method of claim 1, further comprising displaying the electronic message to the number of users allowed access to the electronic message.

10. The method of claim 1, wherein allowing the number of users to access the electronic message according to the message objective comprises allowing users to access messages in a repository rather than having the message delivered to the users.

11. A system for controlling access to categorized messages, the system comprising:
a processor;
memory, communicatively connected to the processor;
an access controller comprising:
an establishing engine to establish,
based on a number of electronic messages associated with a category, a message objective wherein the message objective:
comprises a set of rules to determine how an electronic message is shared;
informs user association, message association, and message access rules for each of multiple categories;
comprises an allow more objective to allow grouping of electronic messages without additional input from a message originator;
comprises a share objective to allow the electronic message to be shared with users in addition to the message originator and a message recipient; and
wherein an electronic message comprises a categories field and a message objectives field;
a receiving engine to receive a change to the message objective;
a categorizing engine to categorize the electronic message into the number of categories according to the message objective, wherein each category comprises a number of electronic messages and to group the electronic message with other electronic messages in the number of categories based on semantically similar message content;
a determining engine to:
determine, based on the message objective, a number of users allowed access to the electronic message;
remove a first user from the number of users allowed access to the electronic message based on the first user having not accessed the electronic message within a specified amount of time; and
add a second user to the number of users allowed access to the electronic message by receiving a request from the second user registering interest in a category; and
an allowing engine to allow the number of users to access the electronic message according to the message objective.

12. The system of claim 11, wherein the electronic message comprises a message originator and a number of message recipients.

13. The system of claim 12, wherein the determining engine determines that the message originator and the number of message recipients are allowed access the electronic message.

14. The system of claim 11, wherein allowing the number of users to access the electronic message further comprises allowing the number of users to access a second electronic message.

15. The system of claim 11, wherein the categorize engine categorizes an electronic message based on a categories field in the electronic message.

* * * * *